Patented Nov. 19, 1940

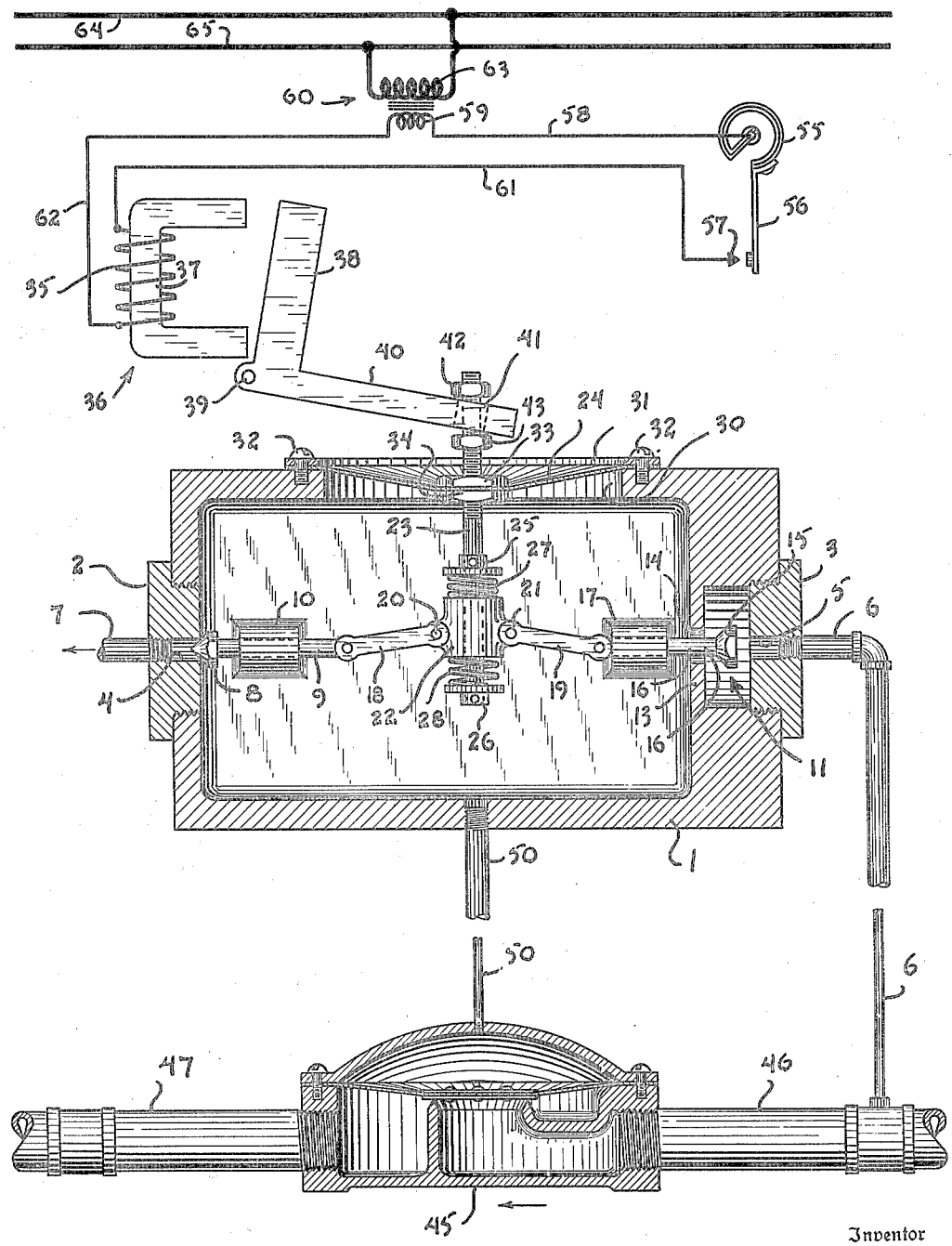

2,222,141

UNITED STATES PATENT OFFICE 2,222,141

VALVE MECHANISM

Frederick S. Denison, Minneapolis, Minn., assignor to Minneapolis-Honeywell Regulator Company, Minneapolis, Minn., a corporation of Delaware Application April 7, 1938, Serial No. 200,743

2 Claims. (Cl. 137—139)

My invention relates to valve structure and actuation and relates more particularly to three-way pilot valves of the type commonly used in connection with diaphragm gas valves.

My object is to provide the art with an inexpensive three-way pilot valve having broad application and embodying new safety features which as far as I am aware have heretofore been unknown to the prior art.

I construct and arrange my device in such a manner that it has an inherent safety feature in that whenever a valve is seated the head of that valve is exposed to pressure tending to maintain it in seated position. Thus any tendency towards seepage through the valve is reduced as the pressure regardless of its magnitude always urges the valve towards closed rather than open position. Upon occurrence of a failure of any part of my device the pressure will maintain the valves in the positions they were in at the time preventing any abnormal or dangerous operation thereof.

I prefer to use an electrical device of the electromagnet and armature type for actuating my valve mechanism. I employ mechanism for transmitting the motion of the armature to the valve mechanism whereby the armature need only apply a small force to produce a relatively large actuating force for the valves. Thus I may use a relatively small and inexpensive electrical actuating device and still enjoy the safety feature contingent upon having pressure act on the valves to maintain them seated. By reason of the large actuating force available for seating the valves, my device will handle much higher pressures safely and efficiently.

Among other objects of my invention are:

The provision of a three-way pilot valve arrangement for controlling pressure so constructed that pressure is on the head of any valve when it is seated.

The provision of valve actuating means having a high mechanical advantage so that a small applied force makes a large force available for moving the valves.

The provision of a three-way pilot valve arrangement so constructed that pressure is exerted on the head of any valve when it is seated and combined with actuating mechanism having a high mechanical advantage whereby large valve moving forces are available even though relatively small forces are applied to the actuating mechanism.

The single figure of the drawing represents a cross section of my improved valve mechanism and illustrating diagrammatically how it may control a diaphragm gas valve.

Referring to the drawing, numeral 1 represents the body or valve chamber of my device having end plugs 2 and 3 in screw threaded relation therewith as shown. Each of the plugs 2 and 3 has a central hole 4 and 5, respectively. The hole 5 is screw threaded at its outer end for receiving the end of an inlet conduit 6 and the outer end of the hole 4 is screw threaded for receiving the end of an outlet conduit 7. The inner end of the hole 4 forms a valve seat for a valve 8 having a stem 9 which is journaled in a portion 10 of an inner wall of the body of the device forming a guide bearing for the stem. The plug 3 is screw threaded into the end of the body 1 in a manner so as to leave a space 11 at its inner end which is separated from the interior of the body by a partition wall 13. The partition wall 13 has a circular opening 14 coaxially arranged with the hole 5 and which forms a seat for a valve 15. The valve 15 has a stem 16 which is journaled in a guide bearing 17 similar to the guide bearing 10. The inner ends of the valve stems 9 and 16 are pivoted to links 18 and 19 and the links are pivoted at their opposite ends 20 and 21, respectively, to a floating cross head 22. The cross head 22 is slidably engaged by an operating stem 23 which extends exteriorly of the body of the valve thru a flexible diaphragm 24. Secured to the operating stem 23 by riveting or the like are collars 25 and 26. Adjacent the collar 25 and encircling the operating stem 23 is a coil spring 27 and adjacent the collar 26 is a similar coil spring 28. The floating cross head 22 is interposed between the inner ends of the coil springs 27 and 28 whereby a strain release mechanism is formed which will be referred to later.

The flexible diaphragm covers and seals an opening 30 in the upper part of the valve body and its peripheral portions are secured to the body of the valve by a metal ring 31 held in place by screws 32. The portion of the operating stem extending through the diaphragm is screw threaded, the diaphragm and stem being secured in their relative engagement by nuts 33 and 34 on opposite sides of the diaphragm as shown.

I prefer to use an electrical device for actuating the operating stem 23 of my valve arrangement. This device I have represented diagrammatically at 36 as comprising a conventional core 37 and coil winding 35 and an armature 38 adjacent thereto. The armature 38 is formed generally as a metal right-angled member pivoted at 39 and having one of its legs 40 engaged on the end of the operating stem 23 thru an opening 41 in the leg 40. Screwed onto the operating stem 23 on the opposite sides of the leg 40 of the armature are nuts 42 and 43 whereby movement of the armature may reciprocate the stem 23 in a vertical direction.

While the apparatus of my invention may be applied in various ways it is primarily intended for use in conjunction with control of diaphragm gas valves of various conventional types. For explanatory purposes, I have diagrammatically shown the use of my valve in connection with a diaphragm gas valve. Referring to the drawing, numeral 45 represents a diaphragm gas valve of common type and which need not be described in detail. The valve 45 has a gas inlet connection 46 and an outlet connecting pipe 47. The small pipe 6 may be connected to the inlet conduit 46 as shown. The outlet pipe 7 of my valve device may communicate with an auxiliary fuel burner in the furnace or the like. The interior of the body of my valve has an outlet at 50 which may connect with the diaphragm chamber of the diaphragm gas valve 45 as shown.

The gas valve 45 may be one employed in various types of gas fired heating systems and I may control my pilot valve device by a thermostat such as the thermostat indicated at 55. This thermostat is of the conventional bimetallic type having a flexible contact blade 56 associated with a fixed contact 57. The thermostat is connected by a wire 58 to the secondary 59 of a voltage step-down transformer 60. The fixed contact 57 is connected by a wire 61 to one end of the coil winding 35 of the device 36 and the other end of the coil winding is connected by a wire 62 to the other end of the secondary winding 59. The transformer 60 may be of conventional type having a primary winding 63 connected to line conductors 64 and 65 which lead to an external source of power, not shown.

The operation of my device should be obvious to those skilled in the art. With the parts in the position shown the thermostat 55 is satisfied and the gas valve 45 is closed. Valve 15 being open gas pressure is communicated from conduit 6 into the interior of the valve body and through the pipe 50 to the space above the diaphragm of the diaphragm gas valve thus causing the valve to be seated. It will be seen that under these conditions the pressure inside the body 1 is acting to urge valve 8 towards its seat. Upon a call for heat by the thermostat 55, the contact blade 56 will now engage the fixed contact 57 causing the coil winding of the electrical device 36 to become energized. Upon energization of the coil winding 35, the armature 38 is drawn towards the coil winding 37 in a counter-clockwise direction causing the leg 40 to move the operating stem 23 substantially vertically. As stem 23 moves vertically the crosshead 22 is also moved vertically and the stems of the valves 8 and 15 are drawn inwardly by the links 18 and 19, respectively. The valve 8 will now engage the guide bearing 10 which serves as a stop and further upward force applied to the stem 23 will now firmly seat the valve 15 upon its seat. Pressure in chamber 11 now urges the valve 15 against its seat. Gas pressure from pipe 6 to the interior of the valve body will now be cut off and pressure from the space above the diaphragm of the valve 45 will be released through the interior of the valve body and out through the opening 4 to the conduit 7. Release of pressure from above the diaphragm of the valve 45 will cause that valve to open in the conventional manner of diaphragm gas valves and gas will flow therethrough for supplying heat to the spaces or objects being heated.

Upon the thermostat 55 becoming satisfied, the coil winding 35 of the electrical device 36 will be deenergized and parts will assume the positions shown in the drawing. Operating stem 23 will be reciprocated downwardly moving the stems 9 and 16 outwardly; the right end of the link 19 will abut the guide bearing 17 and the downward force exerted on the stem 33 due to the weight of the armature 38 will then act through the link 18 to firmly force the valve 8 against its seat. It will be understood by those skilled in the art that the crosshead 22 and links 18 and 19 form toggle joints by reason of which a device having a very high mechanical advantage is formed. A relatively small downward force applied to the stem 23 by reason of the weight of armature 38 will cause a high seating force to be applied to the left upon valve 8 through the link 20 by reason of this high mechanical advantage. Conversely when the stem 23 is moved upwardly the same great seating force will be available for seating the valve 15 upon its seat. It will be noted that I have arranged my valves and valve ports in such a manner that line pressure from the conduit 6 is always above the seat, that is, upon the head of the valve which is seated. Thus line pressure always assists in maintaining the seated valve in closed position and thus when I employ relatively high pressures in my device the danger of the valves being forced off their seats by the pressure is avoided and instead the pressure tends to keep the valves in their proper positions. By interposing the crosshead 22 between the coil springs 27 and 28 a strain release mechanism is formed providing resiliency in the connections between the pilot valves and the armature 38. By reason of this resiliency in the operating connections the danger of rupturing any of the various members when relatively great forces are applied is avoided and quietness of operation is promoted.

From the foregoing it should be apparent that I have provided a three-way pilot valve construction having unusual novelty and utility. Previously known pilot valves of this type have generally been limited to operating pressures of approximately two pounds per square inch. This is true because the weight of a directly connected solenoid or armature was relied on as the sole force for seating a valve in one position of the apparatus. By my particular arrangement my device is adapted for use with much higher pressures and by reason of my arrangement whereby line pressure is always on the head of the seated valve, I have provided an inherent safety feature which prevents improper control of the device being controlled in the event of any type of failure of the pilot valve actuating mechanism. While my pilot valve arrangement may be utilized with high pressures for controlling devices requiring a relatively great amount of power for their operation I may still use a relatively small and inexpensive electrical operating mechanism by reason of the particular valve actuating linkage which I employ. My valve therefore combines the features of economy, utility, and safety.

Various changes in the constructional form and arrangement of parts of my invention will occur to those skilled in the art and it is therefore understood that the disclosed single embodiment is to be interpreted as illustrative only, the scope of the invention to be limited only as determined by the appended claims.

I claim as my invention:

1. In a valve mechanism, a pair of valves, each of said valves having a valve seat associated therewith and both of said valves being movable in the same direction into engagement with their respective seats, a pair of aligned valve stems one secured to each of said valves, a pair of toggle links one secured to each of said stems, a cross-head pivotally connected to said toggle links, and actuating means for moving said cross-head transversely of said valve stems whereby said valves are simultaneously moved in opposite directions.

2. In a valve mechanism, a pair of valves, each of said valves having a valve seat associated therewith and both of said valves being movable in the same direction into engagement with their respective seats, a pair of aligned valve stems one secured to each of said valves, a pair of toggle links one secured to each of said stems, a cross-head pivotally connected to said toggle links, actuating means for moving said cross-head transversely of said valve stems whereby said valves are simultaneously moved in opposite directions, and a strain release connecting means between said actuating means and said cross-head effective to provide for strain release action regardless of the direction of movement of said cross-head.

FREDERICK S. DENISON.